US008788728B2

(12) United States Patent
Gallagher et al.

(10) Patent No.: US 8,788,728 B2
(45) Date of Patent: Jul. 22, 2014

(54) METHOD AND SYSTEM FOR BUFFER STATE BASED LOW POWER OPERATION IN A MOCA NETWORK

(75) Inventors: Timothy Gallagher, Encinitas, CA (US); Glenn DeLucio, San Diego, CA (US); Curtis Ling, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 141 days.

(21) Appl. No.: 13/328,634

(22) Filed: Dec. 16, 2011

(65) Prior Publication Data

US 2013/0159567 A1  Jun. 20, 2013

(51) Int. Cl.
*G06F 3/00* (2006.01)
*G06F 15/16* (2006.01)

(52) U.S. Cl.
USPC .......... 710/52; 710/15; 710/54; 709/217; 709/232

(58) Field of Classification Search
None
See application file for complete search history.

(56) References Cited

U.S. PATENT DOCUMENTS

| 2006/0129703 | A1* | 6/2006 | Oshikawa et al. ............ 710/14 |
| 2007/0037548 | A1* | 2/2007 | Sammour et al. .......... 455/343.2 |
| 2007/0135162 | A1* | 6/2007 | Banerjea et al. .......... 455/556.1 |
| 2008/0095091 | A1* | 4/2008 | Surineni et al. ............ 370/311 |
| 2011/0066673 | A1* | 3/2011 | Outlaw ..................... 709/203 |
| 2011/0264818 | A1* | 10/2011 | Riggert et al. ............. 709/231 |
| 2012/0089851 | A1* | 4/2012 | Ting et al. ................. 713/310 |
| 2012/0266003 | A1* | 10/2012 | Hutchinson et al. ........ 713/320 |
| 2013/0121157 | A1* | 5/2013 | Logvinov et al. ........... 370/238 |

* cited by examiner

*Primary Examiner* — Michael Sun
(74) *Attorney, Agent, or Firm* — McAndrews, Held & Malloy, Ltd.

(57) ABSTRACT

A first device of a Multimedia Over Coax Alliance (MoCA) network may communicate with a second device of the MoCA network to control power-save operation of the second MoCA device. The first device may control the power-save operation of the second MoCA device based on an amount of data stored in a buffer, wherein the data stored in the buffer is destined for the second device. The buffer may be in a third device which sends the data to the second device, and/or the buffer may be in the first device. The first device may be operable to buffer data destined for the second device while the second device is in a power-saving state.

16 Claims, 6 Drawing Sheets

METHOD AND SYSTEM FOR BUFFER STATE BASED LOW POWER OPERATION IN A MOCA NETWORK

FIELD OF THE INVENTION

Certain embodiments of the invention relate to networking. More specifically, certain embodiments of the invention relate to buffer state based low-power operation in a MoCA network.

BACKGROUND OF THE INVENTION

Existing in-home networks consume too much power. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for buffer state based low-power operation in a MoCA network, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the terms "e.g." and "for example" introduce a list of one or more non-limiting examples, instances, or illustrations.

Figure 1:
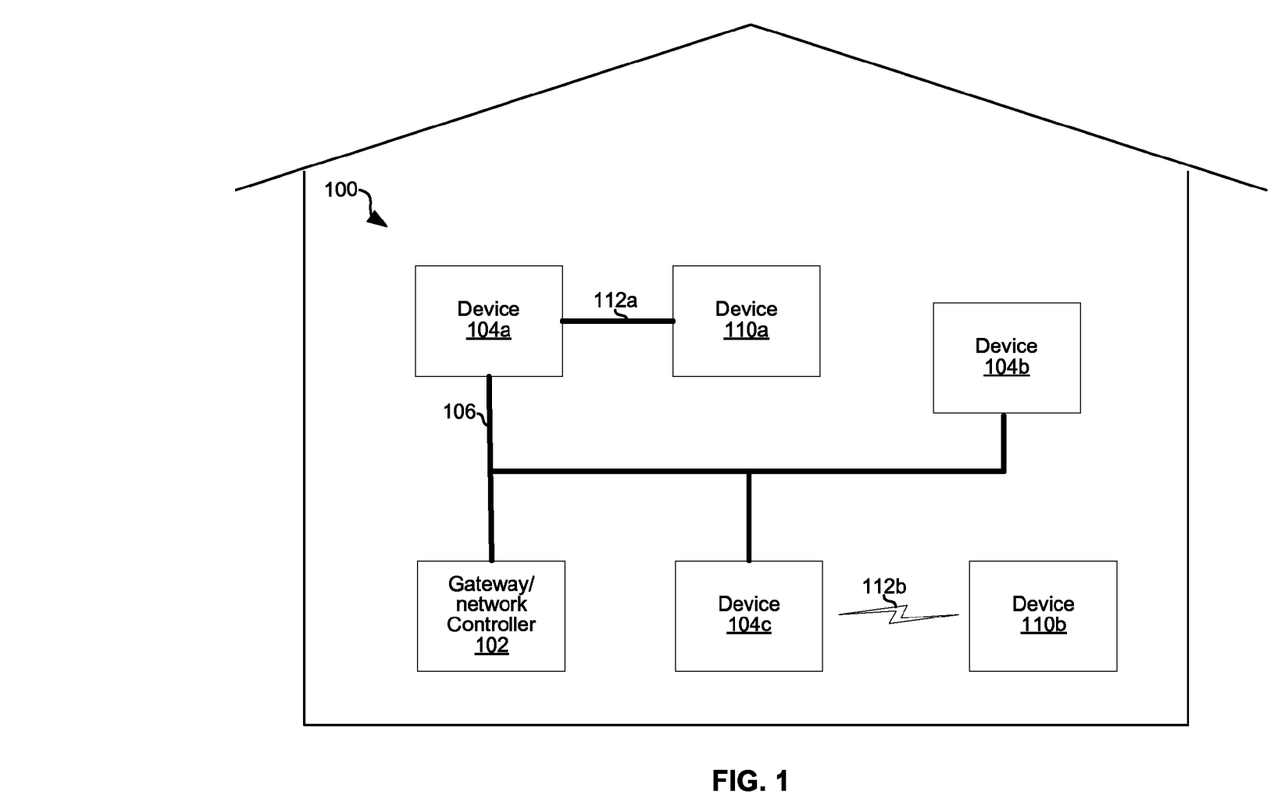
FIG. 1 depicts an exemplary in-home network.

FIG. 1 depicts an exemplary in-home network. FIG. 1 illustrates a local area network (LAN) 100 comprising network devices 102 and 104a-104c coupled via a shared channel 106. The LAN 100 also comprises devices 110a and 110b coupled to network devices 104a and 104c via links 112a and 112b, respectively.

The shared channel 106 may comprise, for example, wired and/or optical cabling. In an exemplary embodiment, the shared channel 106 may comprise coaxial cabling.

The device 102 may comprise circuitry operable to communicate over the shared channel 106. The circuitry of the device 102 may also be operable to support one or more of the devices 104a-104c operating in one or more power-saving states, and/or the device 102 itself operating in one or more power-saving states. The device 102 may be, for example, a set-top box, a gateway, or a router. In an exemplary embodiment, the device 102 may communicate over the shared channel 106 in accordance with Multimedia over Coax Alliance (MoCA) standards. In such an embodiment, the device 102 may function as the network coordinator of the MoCA network.

Each of the devices 104a-104c may comprise circuitry operable to communicate over the shared channel 106. Where the network 100 is a MoCA network, the devices 104a and 104c may be termed an "intermediate device" and the device 104b may be termed a "terminal device." The device 104c may be, for example, a wireless access point operable to convert between the network protocols (e.g., MoCA or DOCSIS) utilized on the shared channel 106 and the network protocols (e.g., IEEE 802.11) utilized on the link 112b. The device 104a may be, for example, a network adaptor operable to convert between the network protocols (e.g., MoCA or DOCSIS) utilized on the shared channel 106 and the network protocols (e.g., HDMI or USB) utilized on the link 112a.

The devices 110a and 110b may comprise circuitry operable to communicate media and/or data via the links 112a and 112b, respectively. Each of the devices 110a and 110b may be, for example, an end-point such as a television or personal computer.

In operation, communications on the shared channel 106 may be coordinated by the device 102. The device 102 may control which devices are granted admission to the network 100. The device 102 may control which of the devices of the network 100 may communicate on the shared channel 106, and control at which times and/or on which frequencies such communication occurs. The device 102 may control whether one or more devices of the network 100 are permitted to operate in a power-saving state. When one or more devices of the network 100 are operating in a power-saving state, the device 102 may adjust its behavior and/or the behavior of other devices, as is described in further detail below.

Figure 2:
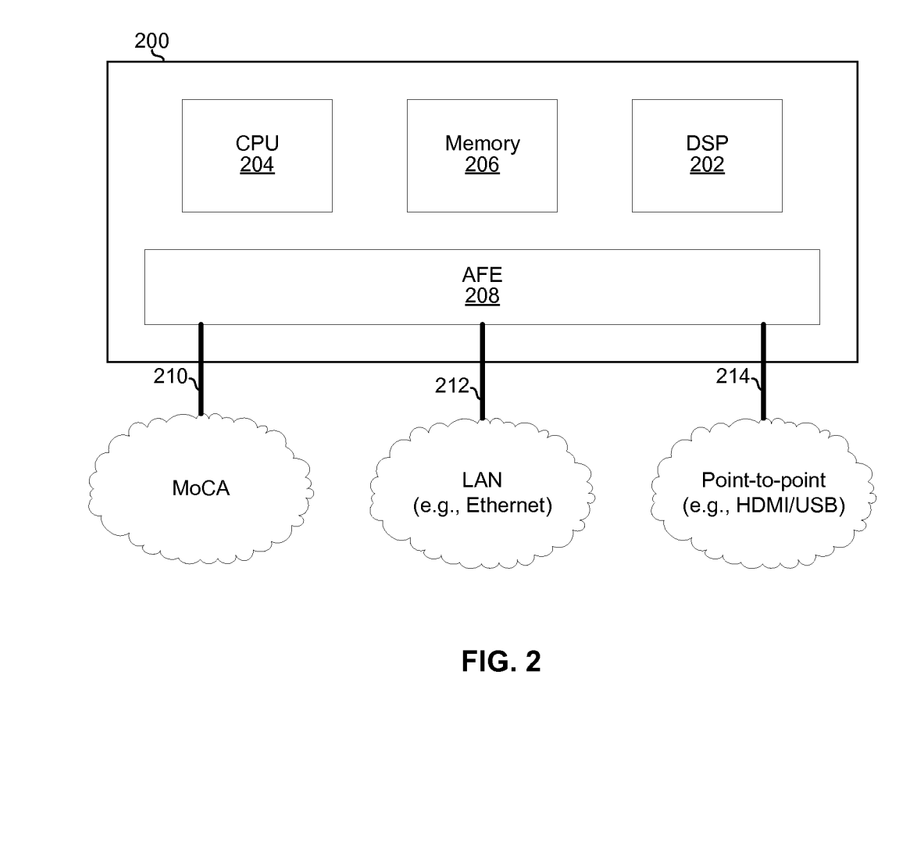
FIG. 2 depicts an exemplary networking device.

FIG. 2 depicts an exemplary networking device. The exemplary device 200 comprises a plurality of modules including a digital signal processor (DSP) 202, a central processing unit (CPU) 204, a memory 206, and an analog front end (AFE) 208. The device 200 may, for example, represent any of the devices 102, 104a, 104b, and 104c, although any one of those devices may comprise additional or fewer features than the device 200.

The AFE 208 may be operable to transmit and/or receive information utilizing any suitable communication protocol(s). The AFE 208 may be operable to perform analog-domain processing operations that enable transmission and/or reception of signals in accordance with one or more communication protocols. In an exemplary embodiment, the AFE 208 may be operable to transmit and/or receive signals in accordance with MoCA standards via a link 210, in accordance with another local area networking standard (e.g., Ethernet or Wi-Fi) via a link 212, and/or in accordance with a point-to-point communication protocol (e.g., USB or HDMI) via a link 214. The AFE 208 may comprise, for example, one or more clocks, one or more digital-to-analog converters, one or more analog-to-digital converters, one or more modulators, one or more demodulators, one or more amplifiers, and/or one or more filters. In an exemplary embodiment, the AFE 208 may be configurable into various states of operation, with the different states of operation being characterized by different power consumption. For example, in a power-saving state of operation, one or more clocks may be slowed down or shut off, one or more modulators and/or demodulators may be configured to utilize lower-order modulation, one or more amplifiers may be configured to provide less gain, etc.

The CPU 204 may be operable to execute instructions (e.g., an operating system) to control operations of the device 200. For example, the CPU 204 may generate control signals for configuring a state of operation of the device 200, and controlling operation of the other components of the device 200. In an exemplary embodiment, the CPU 204 may be configurable into various states of operation, with the different states of operation being characterized by different power consumption. For example, in a power-saving state of operation, the CPU 204 may execute fewer instructions per time interval than when not operating in the power-saving state.

The memory 206 may comprise any suitable type of volatile and/or non-volatile memory operable to store data and/or instructions. For example, the memory 206 may be utilized to store instructions executed by the CPU 204 and buffer data being transmitted and/or received via the AFE 208.

The DSP 202 may be operable to perform digital signal processing algorithms and functions in accordance with one or more communication standards. For example, the DSP 202 may be operable to perform digital filtering, constellation mapping, constellation demapping, interleaving, deinterleaving, and error correction. In an exemplary embodiment of the invention, the DSP 202 may be operable to perform digital-domain processing functions that enable transmission and/or reception of data in accordance with various standards, such as MoCA, Ethernet, and/or HDMI, via the AFE 208. In an exemplary embodiment, the DSP 202 may be configurable into various states of operation, with the different states of operation being characterized by different power consumption. For example, in a power-saving state of operation, different error-correction algorithms may be utilized, different interleaver depth may be utilized, and different constellation mappings may be utilized.

Figure 3:
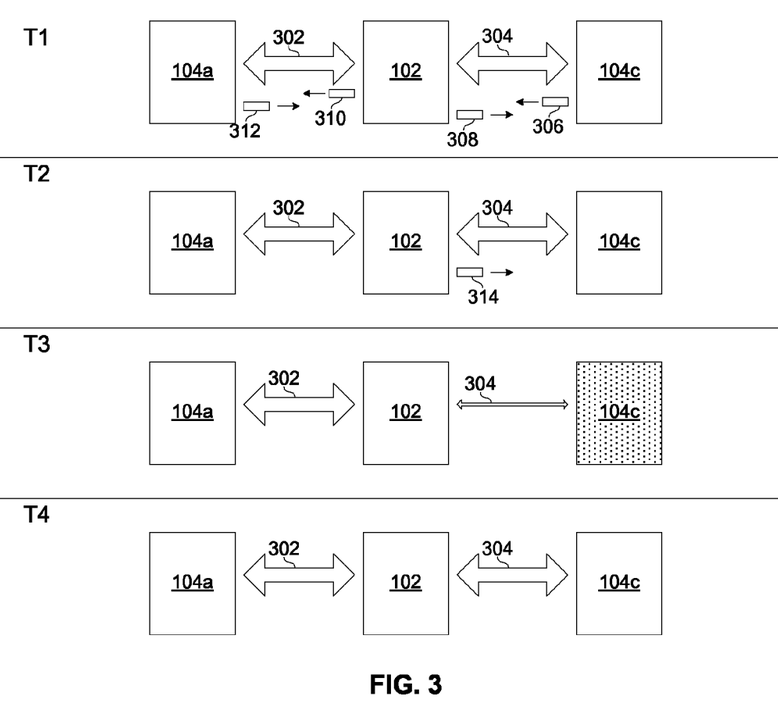
FIG. 3 is a diagram illustrating a network device transitioning into and out of a power-saving state.

FIG. 3 is a diagram illustrating a network device transitioning into and out of a power-saving state. Note that a single power-saving state is shown and discussed for clarity, but it should be recognized that a plurality of alternative power-saving states may be utilized, each having different respective characteristics, non-limiting examples of which will be presented below. Shown in FIG. 3 are the devices 104a, 102, and 104c, with logical links between them represented as arrows 302 and 304, the width of the arrows 302 and 304 representing the bandwidth of the logical links.

During time interval T1, the network coordinator 102 exchanges messages 306 and 308 with the device 104c and messages 310 and 312 with the other devices of the network (of which only device 104a is shown for clarity of illustration) to coordinate the transition of device 104c into a power-saving state. The messages 306 may include a request for permission to enter the power-saving state. In addition, the messages 306, 308, 310, and 312 may include messages to coordinate various parameters such that the transition of device 104c to a power-saving state does not cause lost data, intolerable latency, and/or other problems in the network. For example, the devices 102 and 104a-104c may exchange parameters indicating (1) how long the device 104c will remain in the power-saving state, (2) what messages the device 104c will listen to while in the power-saving state, (3) what messages the device 104c will respond to while in the power-saving state, (4) what signal characteristics the device 104c will detect while in the power-saving state, (5) conditions for bringing the device 104c out of the power-saving state before the predetermined duration has expired, (6) whether the device 104c will be granted transmission opportunities while it is in the power-saving state, (7) how long such transmit opportunities will last, (8) when such transmission opportunities will occur, and/or (9) what PHY profile(s) will be used for communications between the device 102 and 104c both during and after the time period that the device 104c operates in the power-saving state. A PHY profile could include parameters such as, for example, modulation profile (i.e., the type and/or order of modulation to be used for each of one or more subcarriers), preamble type, cyclic prefix length, and transmit power. For example, a device could utilize BPSK when operating in a power-saving state and 64, 128, or 256-QAM when not operating in a power-saving state.

During time interval T2, after completing coordination of the transition, the device 102 may send a message 314 to device 104c granting permission for the device 104c to enter the power-saving state. Such a message may, for example, comprise information describing characteristics of the power-saving state (or set of power-saving states). For example, such a message may comprise information of any of the characteristics described above (e.g., of sleep duration, functionality maintained during sleep operation, modulation characteristics, message exchange sequences to follow, wake triggers, etc.). In an exemplary scenario, the device 102 may consider sleep operation parameters proposed by the device 104c during time interval T1, agreeing to such parameters and mandating and/or proposing alternative parameters as necessary. For example, during time interval T1, the device 104c might have proposed a sleep duration of $S_1$, which is greater than device 102 will allow (e.g., under current system conditions or ever). In such a scenario, during time interval T2, device 102 may command a different sleep duration of $S_2$, which is acceptable to device 102. Note that device 102 may determine sleep state parameters on its own or may, for example, determine sleep parameters based on communication with other devices in the network.

During time interval T3, the device 104c may operate in the power-saving state. In an exemplary embodiment, some bandwidth may be reserved for the device 104c while it is operating in the power-saving state. Such reserved bandwidth may be utilized by "always-on" portions of the device 104c and/or always-on devices which connect to the network 100 via the link 112b (FIG. 1). For example, a reserved bandwidth may be utilized for communication of time synchronization information, interrupt signals, emergency signals, fault signals, wake-up signals, key network management control messages, etc.

While the device 104c is in the power-saving state, other devices may buffer traffic to be sent to the device 104c. In an exemplary embodiment, when the amount of buffered traffic waiting to be sent to device 104c reaches a threshold (e.g., a non-zero threshold), the device 104c may be taken out of the power-saving mode and the traffic may then be sent.

In an exemplary embodiment, higher layers (e.g., OSI layers 3 and above) of the device 104c may remain on while the device 104c is in the power-saving state. Traffic generated by the higher layers may be buffered while the lower OSI layers are in the power-saving state, and may be transmitted upon the lower OSI layers coming out of the power-saving state. In such a scenario, various inter-layer signaling features may be incorporated at the interface between OSI layers, where such signaling features concern the communication of power-save state information. Such power-save state information (e.g., sleep duration, latency estimates, etc.) may, for example, be useful for the upper layers when determining whether frame delays are the result of communication error or by increased latency at a lower layer operating in a power-save mode.

During time interval T4, the device 104c may transition out of the power-saving state and return to an active state in which it fully participates in network activities. In an exemplary embodiment, the device 104c may transition out of the power-saving state upon the device 102 signaling it to transition out of the power-saving state (e.g., because another device has latency-sensitive traffic to send to the device 104c). In an exemplary scenario, the device 102 may (e.g., via signaling) know the identity of particular other network devices that presently have traffic buffered for the device 104c. In such a scenario, the device 102 may signal such other devices (e.g., via broadcast message, multicast message, and/or unicast messages) to notify such other devices that the device 104c is active. Also for example, the device 104c may signal other devices on the network (e.g., via broadcast message, multicast message, and/or unicast messages) to notify such other devices that the device 104c is active. In various implementations, other devices on the network that are not involved with the communication of buffered traffic to the now-active device 104c, may refrain from the communication of relatively low-priority traffic for a particular period of time. Such operation may, for example, free up bandwidth, particularly in contention-based medium access systems. In other implementations, for example, the device 102 may be acting as a network coordinator, thus having control over bandwidth allocation on the network. In such an implementation, the device 102 may allocate bandwidth relatively generously for communication with the now-active device 104c, while allocating relatively low amounts of bandwidth for other communications, in particular when such communications have a relatively low priority.

Figure 4A:
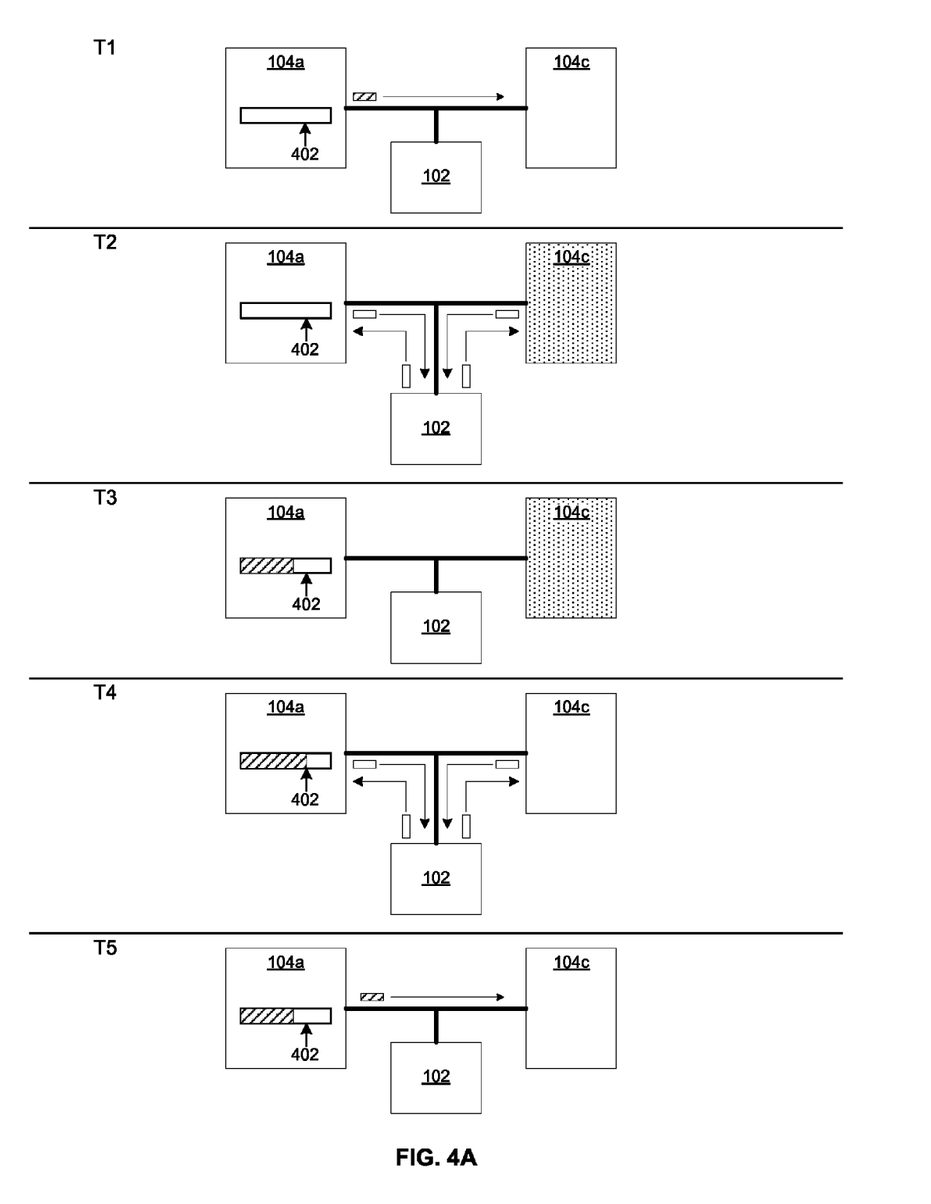
FIGS. 4A and 4B depict controlling a state of operation of a network device based on buffer levels.
Figure 4B:
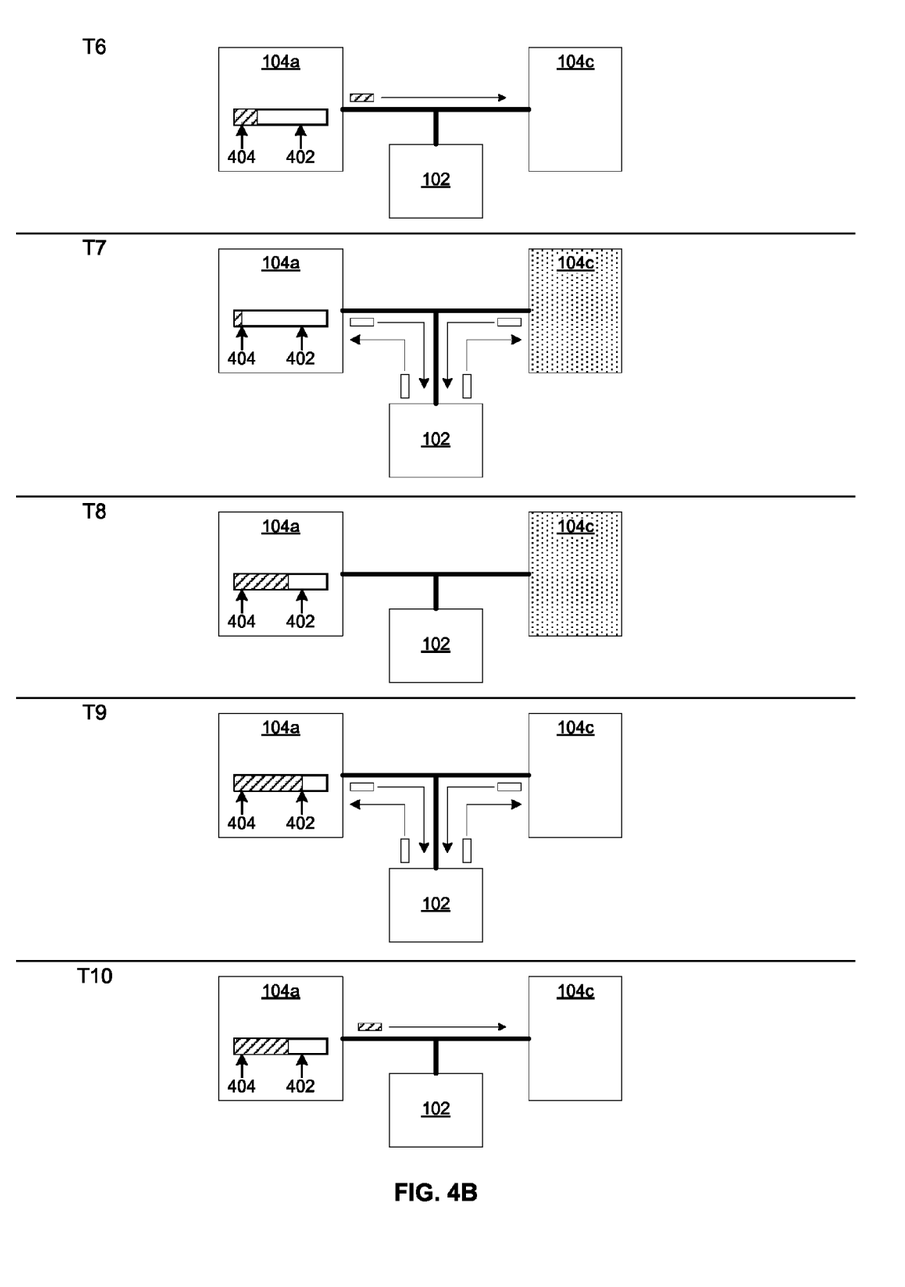

FIGS. 4A and 4B depict controlling a state of operation of a network device based on buffer levels. Referring to FIG. 4A, during time interval T1, the device 104a is sending traffic to device 104c. Subsequently, during time interval T2, the devices 102, 104a, and 104c exchange some information to place the device 104c into a power-saving state. Many non-limiting examples of such information were discussed previously.

Then, during time interval T3, the device 104a is buffering the traffic (e.g., all or most of the traffic) that is destined for 104a. For example, as illustrated during time interval T3, the buffer in device 104a may contain traffic buffered for device 104c, where the amount of such traffic is non-zero yet below the threshold amount of traffic 402. Upon the buffered traffic reaching the threshold 402, the devices 102, 104a, and 104c may exchange messages to transition the device 104c out of the power-saving state.

The threshold 402 may be predetermined and/or determined dynamically during operation of the MoCA network. The threshold 402 may depend on, for example, the latency sensitivity of the data, the priority of the data relative to other traffic in the network, the priority of the device transmitting the data relative to other devices in the network, and/or the priority of the device for which the data is destined, relative to other devices in the network. The threshold 402 may also, for example, depend on the amount of capacity in the buffer beyond the threshold (e.g., excess capacity in the buffer of device 104a may warrant a relatively higher threshold, providing other constraints are met). Also for example, the threshold 402 may depend on the amount of bandwidth presently available and/or anticipated to be available on the network for the communication of buffered traffic (e.g., if available bandwidth is relatively low, it might be necessary to begin draining the buffer sooner than under normal bandwidth availability conditions). Additionally for example, the threshold 402 may depend on the condition of device 104c's power supply (e.g., a device running on limited battery power may warrant a relatively higher threshold and relatively longer sleep duration relative to a device receiving power from the grid).

Next, during time interval T5, the device 104a may transmit the buffered traffic to the device 104c. Such transmission may be performed in any of a variety of manners. For example, as mentioned previously, in an exemplary scenario in which the device 102 controls utilization of the communication bandwidth, the device 102 may explicitly grant the necessary communication bandwidth for the communication of buffered traffic from device 104a to device 104b. In another exemplary scenario, for example a scenario in which access to communication bandwidth is contention-based, the device 104a may contend for access to the necessary communication bandwidth and then utilize acquired bandwidth for the communication of the buffered traffic to device 104c.

Now referring to FIG. 4B, during time interval T6, the device 104a may continue transmitting the buffered traffic and the buffer level may fall. In an exemplary embodiment, as long as the amount of data to be transmitted to device 104c is above a second threshold, the device 104c may be prevented from going into a power-saving state. For example, the device 104a may keep the device 102 apprised of the status of the buffer data, and the device 102 may deny requests from the device 104c to enter the power-saving state until the buffer level drops below the threshold 404. In another example, the device 104a may keep the destination device 104c apprised on the status of the buffer data, causing the device 104c (e.g., operating in accordance with an established power-save protocol) to remain in an active state.

Then, in time interval T7, the amount of traffic buffered in the device 104c falls below the second threshold 404. In response to the traffic falling below the second threshold 404, the devices 102, 104a, and 104c may exchange some messages to transition the device 104c into the power-saving state. Note that such a second threshold 404 (as with the threshold 402) may be static or dynamic (e.g., being adjusted based on any or all of the conditions discussed previously with regard to the threshold 402). Also note that such a second threshold 404 may be set to zero or a non-zero value (e.g., depending on real-time network and/or device conditions). As a non-limiting example, if there are presently no or relatively few devices contending for bandwidth, it may be prudent to completely empty the buffer. Alternatively for example, if there is presently a relatively large amount of contention for network communication bandwidth, the second threshold 404 may be maintained (e.g., at least temporarily) at a relatively high value to allow other devices a fair opportunity to communicate.

Subsequently, during time interval T8, the device 104a may buffer data to be transmitted to the device 104c. Then, during time interval T9, the amount of data buffered may reach the threshold 402. In response to the amount of buffered data reaching the threshold 402, the devices 102, 104a, and 104c may exchange messages to coordinate the device 104c exiting the power-saving state. Next, during time interval T5, the device 104a may transmit the buffered traffic to the device 104c.

Figure 5:
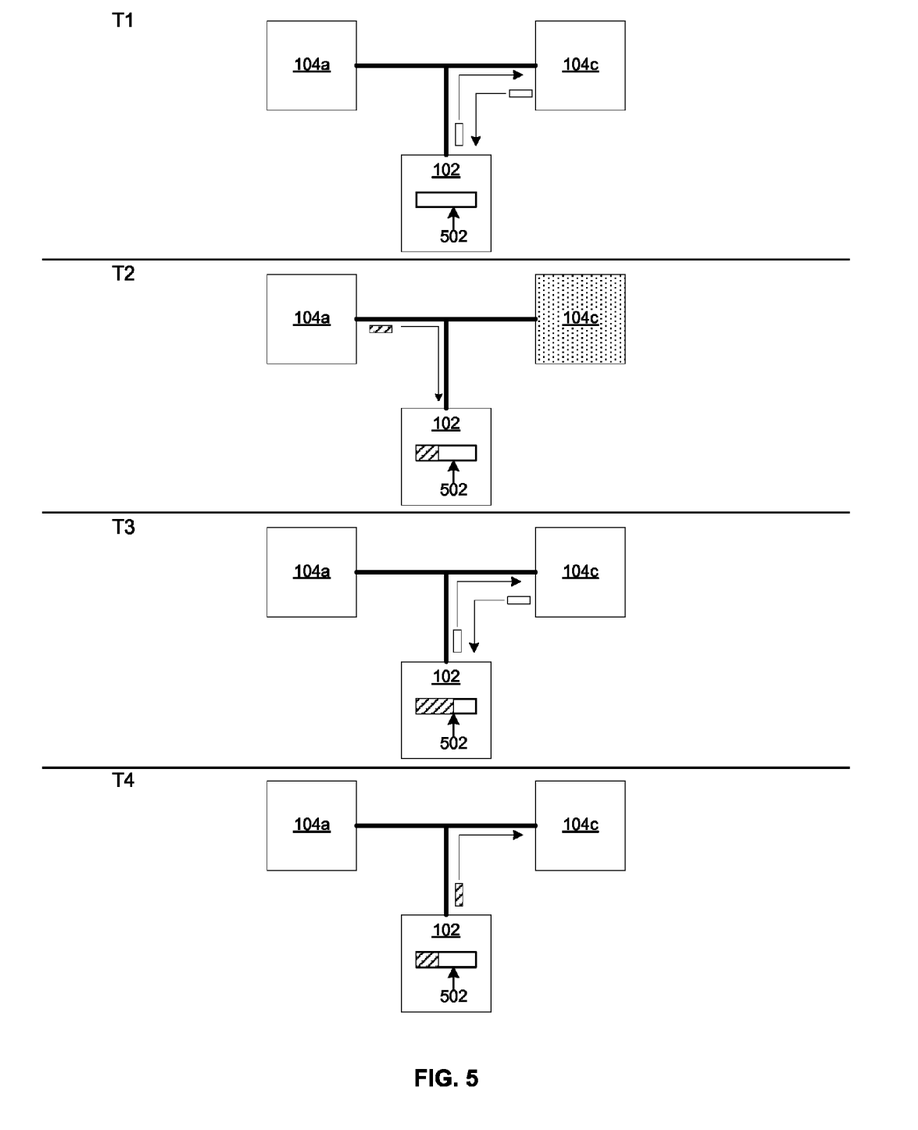
FIG. 5 depicts buffering data in a proxy to support a power-saving state of operation.

FIG. 5 depicts buffering data in a proxy to support a power-saving state of operation. Referring to FIG. 5, there is shown the devices 104a, 104c, and 102. During time interval T1 the devices 104c and 102 are exchanging messages to coordinate the device 104c going into a power-saving state. Note that communication may also occur with device 104a, though such communication is not illustrated. This coordination may include an exchange of parameters which enable the device 102 to receive packets destined for device 104c while device 104c is in the power-saving state. Many non-limiting examples of such parameters were presented previously. Also for example, such parameter exchange may include a negotiation between the device 104c and the device 102 regarding the manner (e.g., timing, amount, etc.) in which the device 102 may store information destined for the device 104c.

During time interval T2, the device may 104a may be sending packets destined for device 104c. In time interval T2, however, the device 104c is in a power-saving state in which it is not enabled to receive packets (or, for example, particular types of packets or signals). Accordingly, the device 102 receives and buffers the packets destined for device 104c. As mentioned above, such receiving and buffering may occur in accordance with parameters negotiated between the device 104c and the device 102.

During time interval T3, the amount of traffic buffered in device 102 may reach the threshold 502. In response to the amount of buffered data reaching the threshold 502, the devices 102, 104a, and 104c (or, for example, just devices 102 and 104c) may exchange messages to coordinate the device 104c coming out of the power-saving state. Next, during time interval T4, the device 102 may transmit the buffered traffic to the device 104c.

Note that in such an exemplary scenario, the source device 104a need not even be aware of the operation of and interaction between the device 102 and the device 104a. In other words, the device 104a may communicate to the device 104c in a completely normal manner, not even knowing that the device 104c is operating in and out of a power-save state. In such an exemplary scenario, though not illustrated in FIG. 5, the device 102 may communicate acknowledgement and other responsive messages to the device 104a on the behalf of the sleeping device 104c. For example, upon the successful completion of error detection by the device 102 for a received packet that is ultimately destined for the device 104c, the device 102 may send any required acknowledgement message to the device 104a. Such messaging may, for example, keep device 104a from timing out while waiting for an ACK message and believing that a communication error has occurred.

In another exemplary scenario, the device 104a may be made aware of the buffering by device 102. For example, in such a scenario, device 104a may send packets directly to the device 102 (e.g., rather than having the device 102 intercept packets addressed to the device 104c). In such a scenario, the source device 104a may either accept response messages (e.g., ACK messages) from the device 102 and/or may accept belated response messages from the device 104c upon buffered messages being forwarded to the device 104c.

In accordance with various aspects of the present invention, one or more circuits for use in a first device (e.g., device 102) of a Multimedia Over Coax Alliance (MoCA) network may communicate with a second device (e.g., device 104c) of the MoCA network to control a state of operation (e.g., one or more power-save states of operation) of the second MoCA device. The one or more circuits may control the state of operation of the second MoCA device based on an amount of data stored in a buffer, wherein the data stored in the buffer is destined for the second device. The buffer may be in a third device which sends the data to the second device, and/or the buffer may be in the first device. The one or more circuits may be operable to buffer data destined for the second device while the second device is in a power-saving state. The one or more circuits may be operable to control the state of operation of the second MoCA device based on a comparison of the amount of data stored in the buffer to one or more thresholds (e.g., thresholds 402 and 404, threshold 502, etc.).

The one or more thresholds may be based on a latency tolerance and/or priority of the data. The one or more thresholds may be based on a priority of the second network device relative to other devices in the MoCA network. The one or more circuits may be operable to control the state of operation of the second device such that the second device enters a power-saving state of operation upon the amount of data in the buffer falling below a threshold. The one or more circuits may be operable to prevent the second device from entering a power-saving state of operation while the amount of data in the buffer is above a threshold. The one or more circuits may be operable to control the state of operation of the second device such that second device comes out of a power-saving state of operation upon the amount of data in the buffer rising above a threshold.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for buffer state based low-power mode in a MoCA network.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
one or more circuits for use in a network coordinator device of a Multimedia Over Coax Alliance (MoCA) network, said one or more circuits being operable to, at least:
communicate with a plurality of client devices of said MoCA network to control power-save operation of each of said client devices; and
control said power-save operation of each of said client devices based on:
an amount of data stored in a buffer, wherein said data stored in said buffer is destined for a first one of said client devices;
a comparison of said amount of data stored in said buffer to a non-zero threshold, wherein said threshold is based on a priority of said first one of said client devices relative to one or more others of said client devices; and
an amount of contention for bandwidth on said MoCA network among said client devices.

2. The system of claim 1, wherein said buffer is in a second one of said client devices which sends said data to said first one of said client devices.

3. The system of claim 1, wherein said buffer is in said network coordinator device.

4. The system of claim 3, wherein said one or more circuits are operable to buffer said data destined for said first one of said client devices while said first one of said client devices is in a power-saving state.

5. The system of claim 1, wherein said threshold is based on one or both of a latency tolerance and/or priority of said data.

6. The system of claim 1, wherein said one or more circuits are operable to increase said threshold when said amount of contention is relatively high and decrease said threshold when said amount of contention is relatively low.

7. The system of claim 1, wherein said one or more circuits are operable to notify a second one of said client devices as to times when said first one of said client devices will be in a power-saving state.

8. The system of claim 7, wherein said one or more circuits are operable to notify said second one of said client devices as to a first physical layer profile to use for communication with said first one of said client devices during said times when said first one of said client devices is in said power-saving state, and a second physical layer profile to use for communication with said first one of said client devices during times when said first one of said client devices is not in said power-saving state.

9. A method comprising:
performing by one or more circuits in a network coordinator device of a Multimedia Over Coax Alliance (MoCA) network:
communicating with a plurality of client devices of said MoCA network to control power-save operation of each of said client devices; and
controlling said power-save operation of each of said client devices based on:
an amount of data stored in a buffer, wherein said data stored in said buffer is destined for a first one of said client devices;
a comparison of said amount of data stored in said buffer to a non-zero threshold, wherein said threshold is based on a priority of said first one of said client devices relative to a one or more others of said client devices; and
an amount of contention for bandwidth on said MoCA network among said client devices.

10. The method of claim 9, wherein said buffer is in a second one of said client devices which sends said data to said first one of said client devices.

11. The method of claim 9, wherein said buffer is in said network coordinator device.

12. The method of claim 11, comprising, performing by the one or more circuits of the first one of said client devices: buffering said data destined for said first one of said client devices while said first one of said client devices is in a power-saving state.

13. The method of claim 9, wherein said threshold is based on one or both of a latency tolerance and/or priority of said data.

14. The method of claim 9, comprising increasing said threshold when said amount of contention is relatively high and decreasing said threshold when said amount of contention is relatively low.

15. The method of claim 9, comprising notifying a second one of said client devices as to times when said first one of said client devices will be in a power-saving state.

16. The method of claim 15, comprising notifying said second one of said client devices as to a first physical layer profile to use for communicating with said first one of said client devices during said times when said first one of said client devices is in said power-saving state, and a second physical layer profile to use for communicating with said first one of said client devices during times when said first one of said client devices is not in said power-saving state.

* * * * *